(12) United States Patent
Takahashi et al.

(10) Patent No.: US 8,343,269 B2
(45) Date of Patent: Jan. 1, 2013

(54) COLORANT COMPOUND

(75) Inventors: Kaoru Takahashi, Saitama (JP); Yasuaki Murai, Kawasaki (JP); Kei Inoue, Tokyo (JP); Masashi Hirose, Machida (JP); Takeshi Miyazaki, Yokohama (JP); Ryosuke Nagao, Kawasaki (JP); Otome Mori, Yokohama (JP); Minako Kawabe, Koganei (JP)

(73) Assignee: Canon Kabushiki Kaisha, Tokyo (JP)

( * ) Notice: Subject to any disclaimer, the term of this patent is extended or adjusted under 35 U.S.C. 154(b) by 318 days.

(21) Appl. No.: 12/875,357

(22) Filed: Sep. 3, 2010

(65) Prior Publication Data

US 2011/0067598 A1    Mar. 24, 2011

(30) Foreign Application Priority Data

Sep. 18, 2009  (JP) .................................. 2009-217326
Dec. 22, 2009  (JP) .................................. 2009-290110

(51) Int. Cl.
*C09D 11/02* (2006.01)
*C07D 311/82* (2006.01)
(52) U.S. Cl. ........................ 106/31.43; 549/388; 549/394
(58) Field of Classification Search ............... 106/31.43; 549/388, 394
See application file for complete search history.

(56) References Cited

U.S. PATENT DOCUMENTS

| | | | |
|---|---|---|---|
| 5,549,740 A | 8/1996 | Takahashi et al. | |
| 5,570,120 A | 10/1996 | Sakaki et al. | |
| 5,591,514 A | 1/1997 | Hirose et al. | |
| 5,601,928 A | 2/1997 | Katayama et al. | |
| 5,614,007 A | 3/1997 | Kurabayashi et al. | |
| 5,618,338 A | 4/1997 | Kurabayashi et al. | |
| 5,624,484 A | 4/1997 | Takahashi et al. | |
| 5,700,314 A | 12/1997 | Kurbayashi et al. | |
| 5,792,249 A | 8/1998 | Shirota et al. | |
| 5,792,389 A * | 8/1998 | Hammond et al. | 549/394 |
| 5,835,116 A | 11/1998 | Sato et al. | |
| 5,847,162 A * | 12/1998 | Lee et al. | 549/385 |
| 5,908,728 A | 6/1999 | Sakaki et al. | |
| 5,939,210 A | 8/1999 | Hirose et al. | |
| 5,954,906 A | 9/1999 | Abe et al. | |
| 5,985,975 A | 11/1999 | Kurabayashi et al. | |
| 6,027,210 A | 2/2000 | Kurabayashi et al. | |
| 6,050,676 A | 4/2000 | Sugimoto et al. | |
| 6,084,006 A | 7/2000 | Kashiwazaki et al. | |
| 6,084,604 A | 7/2000 | Moriyama et al. | |
| 6,162,510 A | 12/2000 | Kashiwazaki et al. | |
| 6,174,056 B1 | 1/2001 | Sakaki et al. | |
| 6,203,604 B1 | 3/2001 | Kashiwazaki et al. | |
| 6,203,899 B1 | 3/2001 | Hirose et al. | |
| 6,238,045 B1 | 5/2001 | Ono et al. | |
| 6,248,482 B1 | 6/2001 | Kashiwazaki et al. | |
| 6,312,102 B1 | 11/2001 | Moriyama et al. | |
| 6,475,601 B1 | 11/2002 | Sakaki et al. | |
| 6,497,478 B1 | 12/2002 | Sugimoto et al. | |
| 6,500,523 B1 | 12/2002 | Hirose et al. | |
| 6,521,323 B1 | 2/2003 | Sakaki et al. | |
| 6,533,852 B2 | 3/2003 | Hirose | |
| 6,730,780 B2 * | 5/2004 | Wakabayashi et al. | 106/31.43 |
| 6,733,120 B2 | 5/2004 | Ogasawara et al. | |
| 6,746,114 B2 | 6/2004 | Takahashi et al. | |
| 6,794,427 B2 | 9/2004 | Kurabayashi et al. | |
| 6,860,931 B2 * | 3/2005 | Wu et al. | 106/31.29 |
| 6,921,433 B2 | 7/2005 | Kuribayashi et al. | |
| 6,964,700 B2 | 11/2005 | Uji et al. | |
| 6,966,944 B2 | 11/2005 | Shimomura et al. | |
| 7,005,461 B2 | 2/2006 | Sanada et al. | |
| 7,083,667 B2 | 8/2006 | Murai et al. | |
| 7,141,342 B2 * | 11/2006 | Toyoda et al. | 430/108.14 |
| 7,208,033 B2 | 4/2007 | Kawabe et al. | |
| 7,244,299 B2 | 7/2007 | Tsuji et al. | |
| 7,297,194 B2 | 11/2007 | Shinjo et al. | |
| 7,303,615 B2 | 12/2007 | Yamagishi et al. | |
| 7,344,701 B2 * | 3/2008 | Reddington et al. | 549/388 |
| 7,364,770 B2 | 4/2008 | Nagashima et al. | |
| 7,371,274 B2 | 5/2008 | Sanada et al. | |
| 7,445,666 B2 | 11/2008 | Yanagimachi et al. | |
| 7,491,830 B2 * | 2/2009 | Lam et al. | 549/388 |
| 7,504,488 B2 | 3/2009 | Toyoda et al. | |
| 7,566,362 B2 | 7/2009 | Mori et al. | |
| 7,598,012 B2 | 10/2009 | Murai et al. | |
| 7,605,192 B2 | 10/2009 | Sanada et al. | |

| | | | |
|---|---|---|---|
| 7,618,484 | B2 | 11/2009 | Fujimoto et al. |
| 7,637,603 | B2 | 12/2009 | Kawabe et al. |
| 7,704,284 | B2 * | 4/2010 | Eliu et al. .......... 8/405 |
| 7,827,982 | B2 | 11/2010 | Masada et al. |
| 2005/0277042 | A1 | 12/2005 | Toyoda et al. |
| 2006/0009357 | A1 | 1/2006 | Fujiwara et al. |
| 2007/0062413 | A1 | 3/2007 | Matsumoto et al. |
| 2007/0222842 | A1 | 9/2007 | Masada et al. |
| 2008/0106581 | A1 | 5/2008 | Sanada et al. |
| 2008/0214811 | A1* | 9/2008 | Reddington et al. .......... 549/394 |
| 2009/0238974 | A1 | 9/2009 | Kawabe et al. |
| 2009/0238975 | A1 | 9/2009 | Yamakami et al. |
| 2009/0238976 | A1 | 9/2009 | Ishii et al. |
| 2009/0238977 | A1 | 9/2009 | Kawabe et al. |

FOREIGN PATENT DOCUMENTS

| | | |
|---|---|---|
| DE | 2460491 A1 | 7/1976 |
| GB | 1503380 A | 3/1978 |
| JP | 8-73791 A | 3/1996 |
| JP | 09-157562 A | 6/1997 |
| JP | 9-241553 A | 9/1997 |
| JP | 09-255882 A | 9/1997 |
| JP | 2003-192930 A | 7/2003 |
| JP | 2006-143989 A | 6/2006 |
| JP | 2008-094897 A | 4/2008 |
| WO | 2004/104108 A1 | 12/2004 |

OTHER PUBLICATIONS

Jan. 20, 2011 European Search Report in European Patent Appln. No. 10009436.6.

Oct. 9, 2012 Chinese Official Action in Chinese Patent Appln. No. 201010287869.0.

\* cited by examiner

*Primary Examiner* — Helene Klemanski

(74) *Attorney, Agent, or Firm* — Fitzpatrick, Cella, Harper & Scinto

(57) ABSTRACT

The present invention is a colorant compound represented by the following general formula (1):

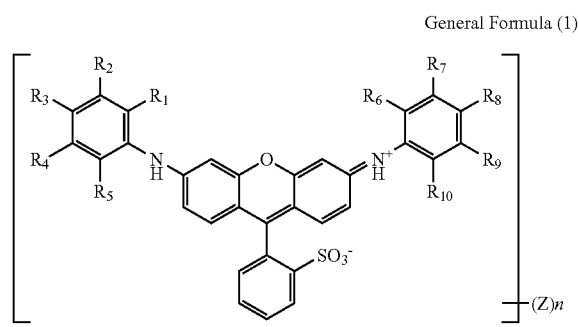

General Formula (1)

wherein at least one of $R_2$, $R_4$, $R_7$ and $R_9$ is an acylamino group represented by the following general formula (2):

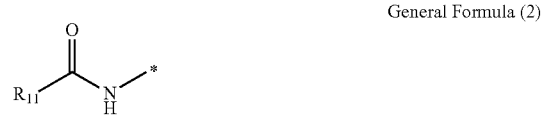

General Formula (2)

wherein $R_{11}$ denotes one of an alkyl group, a cycloalkyl group, an aryl group, an arylalkyl group, an alkenyl group and a heterocyclic group; and '*' denotes a bonding site with an aromatic ring of the general formula (1).

11 Claims, 5 Drawing Sheets

COLORANT COMPOUND

BACKGROUND OF THE INVENTION

1. Field of the Invention

The present invention relates to a colorant compound.

2. Description of the Related Art

As colorant compounds having a high magenta coloring ability, xanthene-based colorant compounds are known. The reason why the coloring ability of the xanthene-based colorant compounds is high is because the xanthene-based colorant compounds have two high absorption bands (x-band and y-band) in the visible region, and give a color tone in which a complementary color of the two absorption bands is observed. Among such xanthene-based colorant compounds, C.I.Acid Red 289 is widely-known to those skilled in the art as a colorant compound having a very good coloring ability as magenta color, and having transparency.

However, xanthene-based colorant compounds including C.I.Acid Red 289 have a problem particularly with respect to light fastness. As the methods for improving the light fastness of such xanthene-based colorant compounds, the methods of using colorant compounds are disclosed in Japanese Patent Application Laid-Open No. H09-241553 and Japanese Patent Application Laid-Open No. 2008-094897.

SUMMARY OF THE INVENTION

The present invention is a colorant compound represented by the following general formula (1).

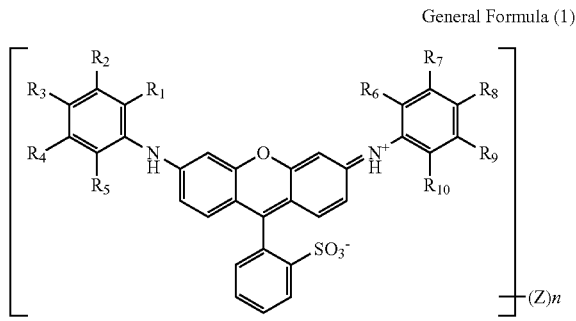

General Formula (1)

[In the general formula (1), $R_1$, $R_5$, $R_6$ and $R_{10}$ each independently denote an alkyl group; $R_3$ and $R_8$ each independently denote one of a hydrogen atom, an alkyl group, an alkoxy group and an aryloxy group; $R_2$, $R_4$, $R_7$ and $R_9$ each independently denote one of a hydrogen atom and an acylamino group represented by the general formula (2) shown below, and at least one of $R_2$, $R_4$, $R_7$ and $R_9$ is an acylamino group represented by the general formula (2) shown below; Z denotes one of an $SO_3H$ group, an $SO_3M$ group and a sulfamoyl group, M denotes one of an ammonium ion and an alkali metal ion, and Z is substituted at a position of at least one hydrogen atom of an aromatic ring; and n denotes an integer of 0 to 3 in the case where at least one of $R_2$, $R_3$, $R_4$, $R_7$, $R_8$ and $R_9$ is substituted with an ionic group, and n denotes an integer of 1 to 3 in the case where none of $R_2$, $R_3$, $R_4$, $R_7$, $R_8$ and $R_9$ is substituted with an ionic group.]

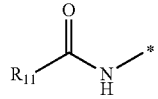

General Formula (2)

[In the general formula (2), $R_{11}$ denotes one of an alkyl group, a cycloalkyl group, an aryl group, an arylalkyl group, an alkenyl group and a heterocyclic group; and '*' denotes a bonding site with an aromatic ring in the general formula (1).]

The present invention can provide a colorant compound having a high magenta coloring ability similarly to C.I.Acid Red 289, and having a high light fastness and a high ozone resistance.

Further features of the present invention will become apparent from the following description of exemplary embodiments with reference to the attached drawings.

DESCRIPTION OF THE EMBODIMENTS

Figure 1:
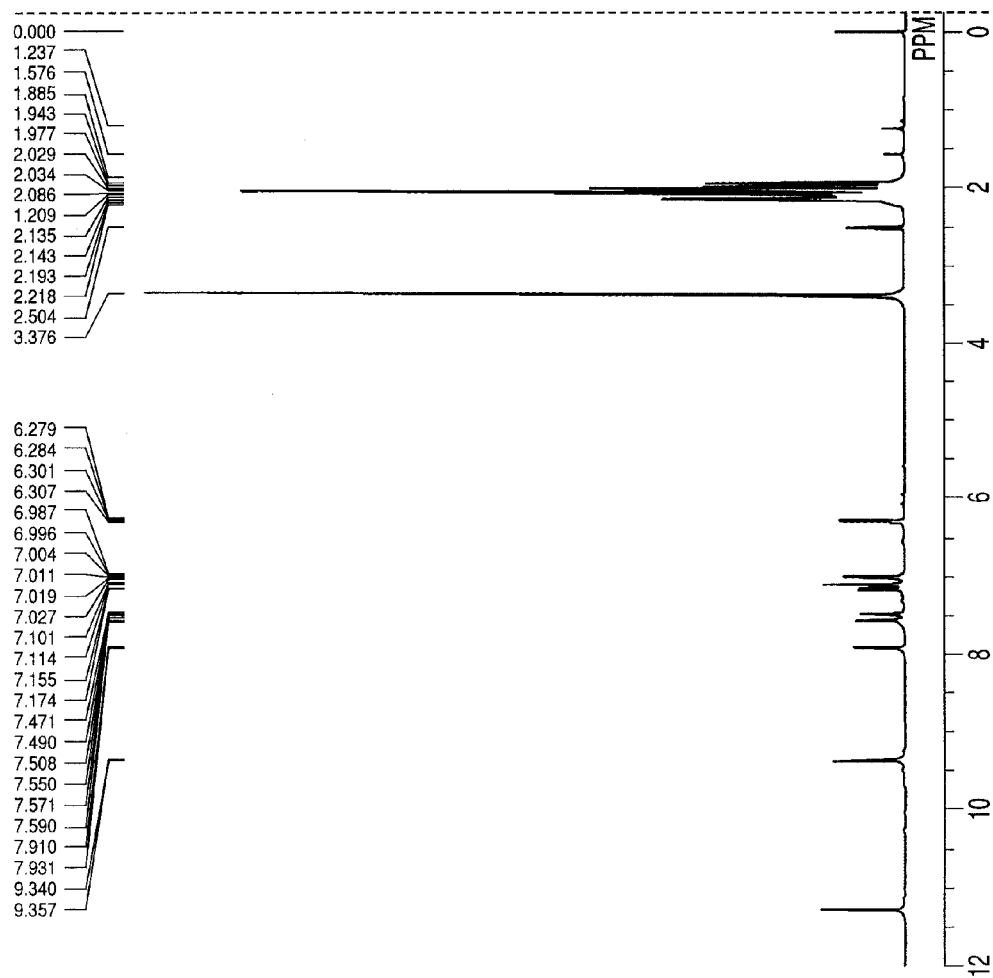
FIG. 1 is a $^1H$ NMR spectrum chart of a colorant compound (8) according to the present invention.

Preferred embodiments of the present invention will now be described in detail in accordance with the accompanying drawings.

The colorant compound disclosed in Japanese Patent Application Laid-Open No. H09-241553 has a hue different from that of C.I.Acid Red 289, and exhibits a bluish color, and thus has a difficulty in providing a good magenta color. Further, this colorant compound is also insufficient in light fastness and ozone resistance. The colorant compound disclosed in Japanese Patent Application Laid-Open No. 2008-094897 exhibits a more bluish color than C.I.Acid Red 289, and thus the use thereof as a complementary color of blue color is favorable, but the use thereof as a colorant having a magenta hue is difficult.

Therefore, it is an object of the present invention to provide a colorant compound having a high magenta coloring ability similarly to C.I.Acid Red 289, and having a high light fastness and a high ozone resistance.

Hereinafter, the present invention will be described further in detail by way of exemplary embodiments. The present inventors have exhaustively studied to solve the above-mentioned problems in the prior art. As a result, the present inventors have found a colorant compound represented by the general formula (1) shown below as a colorant compound having a high magenta coloring ability similarly to C.I.Acid Red 289, and having a high light fastness and a high ozone resistance.

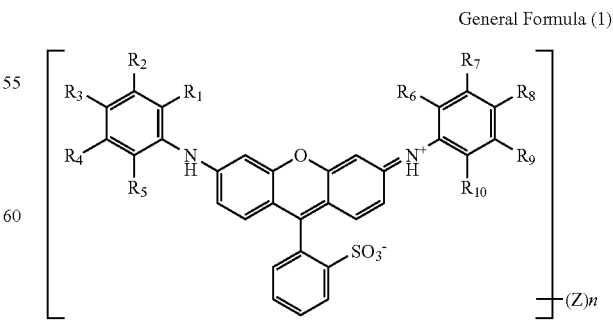

General Formula (1)

[In the general formula (1), $R_1$, $R_5$, $R_6$ and $R_{10}$ each independently denote an alkyl group; $R_3$ and $R_8$ each independently denote one of a hydrogen atom, an alkyl group, an alkoxy group and an aryloxy group; $R_2$, $R_4$, $R_7$ and $R_9$ each independently denote one of a hydrogen atom and an acylamino group represented by the general formula (2) shown below, and at least one of $R_2$, $R_4$, $R_7$ and $R_9$ is an acylamino group represented by the general formula (2) shown below; Z denotes one of an $SO_3H$ group, an $SO_3M$ group and a sulfamoyl group, M denotes one of an ammonium ion and an alkali metal ion, and Z is substituted at a position of at least one hydrogen atom of an aromatic ring; and n denotes an integer of 0 to 3 in the case where at least one of $R_2$, $R_3$, $R_4$, $R_7$, $R_8$ and $R_9$ is substituted with an ionic group, and n denotes an integer of 1 to 3 in the case where none of $R_2$, $R_3$, $R_4$, $R_7$, $R_8$ and $R_9$ is substituted with an ionic group.]

General Formula (2)

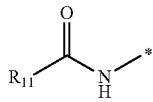

[In the general formula (2), $R_{11}$ denotes one of an alkyl group, a cycloalkyl group, an aryl group, an arylalkyl group, an alkenyl group and a heterocyclic group; and '*' denotes a bonding site with an aromatic ring in the general formula (1).]

In the general formula (1), $R_3$ and $R_8$ each independently denote one of a hydrogen atom, an alkyl group, an alkoxy group and an aryloxy group. Examples of the alkyl group include a methyl group, an ethyl group, an n-propyl group, an isopropyl group, n-butyl group, an isobutyl group, a sec-butyl group, a tert-butyl group, a hydroxyethyl group, a methoxyethyl group, a cyanoethyl group, a trifluoromethyl group, a 3-sulfopropyl group and a 4-sulfobutyl group. Examples of the alkoxy group include a methoxy group, an ethoxy group, an isopropoxy group, a methoxyethoxy group, a hydroxyethoxy group and a 3-carboxypropoxy group. Examples of the aryloxy group include a phenoxy group, a p-methoxyphenoxy group, an o-methoxyphenoxy group, a tolyloxy group, a xylyloxy group and a naphthoxy group. The alkyl group, the alkoxy group and the aryloxy group may have a substituent. Examples of the substituent include an alkyl group, an aryl group, an arylalkyl group, a hydroxyl group, a carbamoyl group, a sulfamoyl group, an alkoxy group, a cyano group, a halogen atom and an ionic group. Examples of the ionic group include cationic groups such as a triethylammonium group and a trimethylammonium group, and anionic groups such as a carboxylic group, a sulfonic group and a phosphoric group. In the present invention, $R_3$ and $R_8$ are preferably a methyl group, an ethyl group and a propyl group from the viewpoint of light fastness. Further, in the case where $R_3$ and $R_8$ have substituents, the substituents are preferably all the same from the viewpoint of the synthesis.

In the general formula (1), $R_2$, $R_4$, $R_7$ and $R_9$ each independently denote one of a hydrogen atom and an acylamino group represented by the general formula (2) shown above, and at least one of $R_2$, $R_4$, $R_7$ and $R_9$ is an acylamino group represented by the general formula (2) shown above. In order for a dye of the general formula (1) to have a high light fastness and a high ozone resistance while having a high coloring ability similarly to C.I.Acid Red 289, at least one of $R_2$, $R_4$, $R_7$ and $R_9$ is preferably an acylamino group represented by the general formula (2) shown above. In the present invention, the number of acylamino groups of the general formula (2) is preferably 2 or more and 4 or less from the viewpoint of the coloring ability and light fastness. In the case where a dye of the general formula (1) has a plurality of acylamino groups of the general formula (2), the acylamino groups are preferably the same from the viewpoint of the synthesis. Further from the viewpoint of the synthesis, in the general formula (1), combinations of $R_1$ and $R_6$, $R_2$ and $R_7$, $R_3$ and $R_8$, $R_4$ and $R_9$, and $R_5$ and $R_{10}$ are preferably each the same.

In the general formula (2), $R_{11}$ denotes one of an alkyl group, a cycloalkyl group, an aryl group, an arylalkyl group, an alkenyl group and a heterocyclic group. Examples of the alkyl group include a methyl group, an ethyl group, an n-propyl group, an isopropyl group, an n-butyl group, an isobutyl group, a sec-butyl group, a tert-butyl group, a hydroxyethyl group, a methoxyethyl group, a cyanoethyl group, a trifluoromethyl group, a 3-sulfopropyl group and a 4-sulfobutyl group. Examples of the cycloalkyl group include a cyclopentyl group, a cyclohexyl group and a cycloheptyl group. Examples of the aryl group include a phenyl group, a p-tolyl group, a p-methoxypheny group, an o-chlorophenyl group and a m-(3-sulfopropylamino)phenyl group. Examples of the arylalkyl group include a benzyl group and a 2-phenethyl group. Examples of the alkenyl group include a vinyl group, a 1-propenyl group, a 2-propenyl group, a 1-methylethenyl group, a 1-butenyl group, a 2-butenyl group and a 3-butenyl group. Examples of the heterocyclic group include an imidazolyl group, a benzoimidazolyl group, a pyrazolyl group, a benzopyrazolyl group, a triazolyl group, an thiazolyl group, a benzothiazolyl group, an isothiazolyl group, a benzoisothiazolyl group, an oxazolyl group, a benzoxazolyl group, a thiadiazolyl group, a pyrrolyl group, a benzopyrrolyl group, the indolyl group, an isoxazolyl group, a benzoisoxazolyl group, a thienyl group, a benzothienyl group, a furyl group, a benzofuryl group, a pyridyl group, a quinolyl group, an isoquinolyl group, a pyridazinyl group, a pyrimidinyl group, a pyrazinyl group, a cinnolinyl group, a phthalazinyl group, a quinazolinyl group, a quinoxalinyl group and a triazinyl group.

Each group of $R_{11}$ may have a substituent. Examples of the substituent include an alkyl group, an aryl group, an arylalkyl group, an alkenyl group, an alkoxy group, a cyano group, an alkylamino group, a sulfoalkyl group, a carbamoyl group, a sulfamoyl group, a sulfonylamino group, a halogen atom and an ionic group. Examples of the ionic group include cationic groups such as a triethylammonium group and a trimethylammonium group, and anionic groups such as a carboxylic group, a sulfonic group and a phosphoric group. In this invention, $R_{11}$ is preferably an alkyl group, a cycloalkyl group, an aryl group and an arylalkyl group, and especially preferably an alkyl group and an aryl group, from the viewpoint of the coloring ability. Above all, $R_{11}$ is preferably a straight chain alkyl group and an aryl group substituted with an ionic group, from the viewpoint of providing an especially excellent light fastness.

In the general formula (1), Z denotes one of an $SO_3H$ group, an $SO_3M$ group and a sulfamoyl group, and M denotes one of an ammonium ion and an alkali metal ion, and Z is substituted at a position of at least one hydrogen atom. Examples of the sulfamoyl group include an aminosulfonyl group, a methylaminosulfonyl group, a dimethylaminosulfonyl group and a butylaminosulfonyl group. M in the $SO_3M$ group is a counter ion, and examples thereof include alkali metals such as lithium, sodium and potassium, unsubstituted ammonium, methylammonium, dimethylammonium, trimethylammonium, tetramethylammonium, ethylammonium, diethylammonium, triethylammonium, tetraethylammonium, n-propylammonium, isopropylammonium, diisopropylammonium, n-butylammonium, tetra-n-butylammonium, isobutylammonium, monoethanol ammonium, diethanol ammonium and triethanol ammonium. Above all, M is preferably a lithium ion, a sodium ion and an ammonium ion from the viewpoint of having a good solubility to water. In the present invention, in order for the dye of the general formula (1) to have an excellent solubility to an aqueous medium, Z is preferably an $SO_3M$ group. Here, although the description in the present invention describes M as "M is a counter ion" because at least a part of the $SO_3M$ groups generate the ionic dissociation in an ink to become a counter ion, the present invention of course includes the case where the ionic dissociation is not generated.

In the general formula (1), in the case where at least one of $R_2$, $R_3$, $R_4$, $R_7$, $R_8$ and $R_9$ is substituted with an ionic group, n denotes an integer of 0 to 3, and in the case where none of those groups is substituted with an ionic group, n denotes an integer of 1 to 3. n is preferably 1 or 2 from the viewpoint of exhibiting a good solubility to water.

The substitution position of Z in the general formula (1) is determined depending on the substitution position of other substituents in the general formula (1) and on the condition of sulfonation or chlorosulfonation. In the case where at least one of $R_2$, $R_3$, $R_4$, $R_7$, $R_8$ and $R_9$ is a hydrogen atom, the hydrogen atom is replaced by Z, and Z bonds to an aromatic ring. In the case where $R_{11}$ has an aromatic ring, and an aromatic hydrogen atom is present, Z may bond to the aromatic ring. In the case where all of $R_2$, $R_3$, $R_4$, $R_7$, $R_8$ and $R_9$ are substituents other than a hydrogen atom, and a substituent of $R_{11}$ does not have an aromatic hydrogen atom, a hydrogen atom of a xanthene skeleton is replaced by Z, and Z bonds to an aromatic ring. In the present invention, the substitution position of Z is preferably one of $R_2$, $R_3$, $R_4$, $R_7$, $R_8$ and $R_9$ from the viewpoint of the synthesis.

The colorant compound represented by the general formula (1) according to the present invention can be synthesized based on well-known manufacturing methods. One example of synthesis schemes will be shown below.

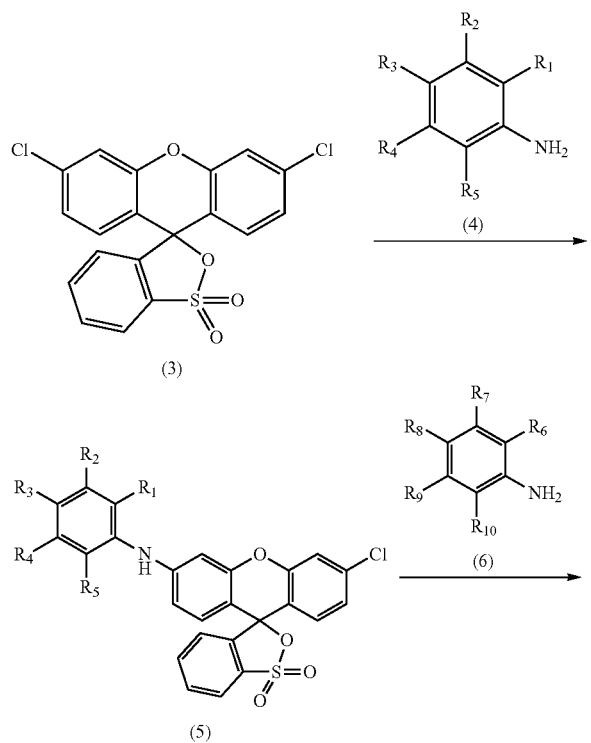

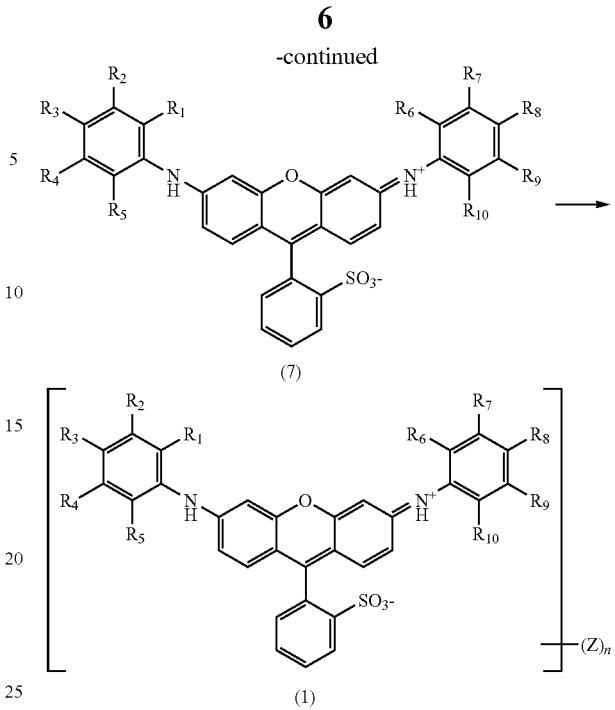

[$R_1$ to $R_{10}$ in the compounds (4) to (7) shown above are the same as $R_1$ to $R_{10}$ in the general formula (1) shown before.]

In the scheme exemplified above, the colorant compound (1) according to the present invention is synthesized through a first condensation process shown at a first stage, a second condensation process shown at a second stage, and a sulfonation or sulfamoylation process shown at a third stage. Here, in the case where substituents of $R_2$, $R_3$, $R_4$, $R_7$, $R_8$ and $R_9$ include ionic groups such as an $SO_3H$ group and a carboxylic group, the sulfonation or sulfamoylation process of the third stage may not be carried out.

First, in the first condensation process shown at the first stage, a compound (3) and a compound (4) are heated and condensed in the presence of an organic solvent and a condensing agent. Then, as shown in the second stage, a compound (5) obtained in the first condensation process shown above and a compound (6) shown above are again heated and condensed to obtain a compound (7). Lastly, the compound (7) is sulfonated using a sulfonating agent (concentrated sulfuric acid, fuming sulfuric acid or the like) to obtain a colorant compound (1) in which Z is an $SO_3H$ group. Alternatively, the compound (7) is chlorosulfonated using chlorosulfonic acid, and thereafter allowed to react with a concentrated ammonia water, an alkylamine or an arylamine to obtain a colorant compound (1) in which Z is a sulfamoyl group.

The organic solvent used in the condensation reaction in the synthesis scheme exemplified above will be described. In the first condensation process, an organic solvent such as methanol, ethanol, n-propanol, isopropanol or n-butanol is preferably used singly or as a mixture thereof. In the second condensation process, an organic solvent such as ethylene glycol, N-methylpyrrolidone, N,N-dimethylacetamide, N,N-dimethylformamide, dimethyl sulfoxide, sulfolane, chlorobenzene, dichlorobenzene, trichlorobenzene or nitrobenzene is preferably used singly or as a mixture thereof.

The reaction temperature in the first condensation process described above is preferably 60° C. or higher and 100° C. or lower. Particularly, the temperature is more preferably 70° C. or higher, and more preferably 90° C. or lower. The reaction temperature in the second condensation process is preferably 120° C. or higher and 220° C. or lower. The temperature is more preferably 180° C. or lower.

In the case of synthesizing a compound in which $R_1$ to $R_5$ and $R_6$ to $R_{10}$ in the general formula (1) are respectively the same groups, compounds (4) and (6) in the scheme described above to be usable can be the same. Therefore, in this case, a compound (7) can be obtained from a compound (3) through one stage of the condensation process. The reaction temperature at this time is preferably 120° C. or higher and 220° C. or lower, and more preferably 180° C. or lower. As a condensing agent, for example, magnesium oxide, zinc chloride and aluminum chloride are preferably used.

A final reaction product (colorant compound) obtained by the reaction scheme described above is subjected to a usual post-treatment of an organic synthetic reaction, and then purified; and the colorant compound can be thereby used for target applications such as aqueous recording liquids. The colorant compound can be identified using $^1$H nuclear magnetic resonance spectroscopy, LC/TOF MS, a UV/Vis spectrophotometer, and the like.

Since the colorant compound according to the present invention has a high magenta coloring ability, and a high light fastness and a high ozone resistance, the colorant compound can be used favorably as coloring materials for recording liquids for printing, recording liquids for coatings and writing implements, and the like. Further, the colorant compound can be used favorably also as coloring materials for recording liquids for ink jet.

In the case where the colorant compound is used for a recording liquid, it is preferable that the colorant compound and an aqueous medium are mixed and used. The aqueous medium includes water and conventionally well-known water-soluble organic solvents. The water-soluble organic solvents include well-known ones such as alcohols, glycols, glycol ethers and nitrogen-containing compounds. These may be used singly or in combined use of two or more. Examples of especially preferable water-soluble organic solvents include 2-methyl-1,3-propanediol, 1,5-pentanediol, 3-methyl-1,5-pentanediol, 1,2-hexandiol, 1,6-hexandiol, bis(2-hydroxyethyl) sulfone, 2-pyrrolidone, 1-(2-hydroxyethyl)-2-pyrrolidinone, ethylene glycol, diethylene glycol, propylene glycol, triethylene glycol, diethylene glycol monobutyl ether, triethylene glycol monobutyl ether, tetraethylene glycol and glycerol.

A recording liquid may contain a surfactant. The surfactant includes acetylene glycol-based surfactants, silicone-based surfactants and polyoxyethylene alkyl ethers. Above all, acetylene glycol-based surfactants are preferable. An acetylene glycol-based surfactant having a structure in which ethylene oxide is added to acetylene glycol is especially preferable. The recording liquid may further contain various types of conventionally well-known additives such as pH regulators, rust preventives, antiseptics, antifungal agents, antioxidants, reduction preventives, evaporation accelerators, chelating agents and water-soluble polymers.

The recording liquid according to the present invention may contain, in addition to a colorant compound represented by the general formula (1), colorant compounds (pigment, dye) having a structure different from the general formula (1) for color toning. The content A (% by mass) of a colorant compound represented by the general formula (1) in a recording liquid is preferably 0.1% by mass or more and 10.0% by mass or less, and more preferably 0.1% by mass or more and 5.0% by mass or less, based on the total mass of an ink.

A colorant compound (a second colorant compound) having a structure different from the general formula (1) for combined use with a colorant compound represented by the general formula (1) is preferably an azo-based dye and/or an anthrapyridone-based dye. Azo-based dyes and anthrapyridone-based dyes having any structure may be used. In the present invention, in the case where the dye is a water-soluble dye, the dye has a maximum absorption wavelength ($\lambda_{max}$) in water preferably in the range of 380 to 590 nm, more preferably 480 to 570 nm, and especially preferably 500 to 560 nm, from the viewpoint of the color tone.

Specific examples of the azo-based dyes and anthrapyridone-based dyes include exemplified compounds (1) to (4) having structures exemplified below in a free acid form. The present invention of course is not limited to compounds exemplified below.

Examples of the azo-based dyes include ones disclosed in Japanese Patent Application Laid-Open Nos. H08-73791 and 2006-143989. Specifically, exemplified compounds (1) and (2) exemplified below are especially suitable.

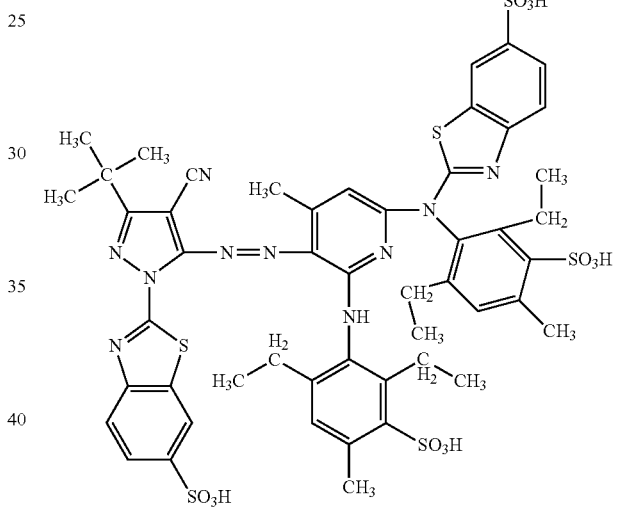

Exemplified Compound (1)

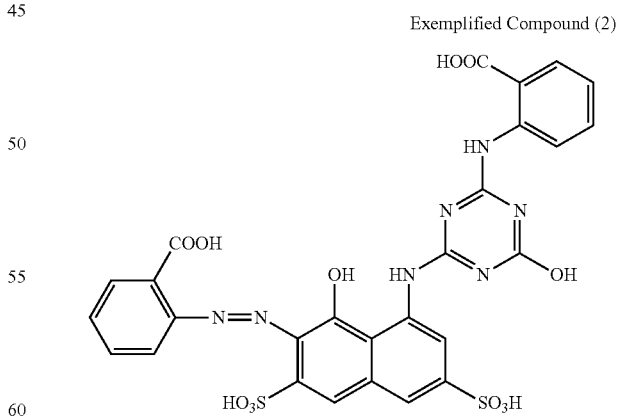

Exemplified Compound (2)

Examples of the anthrapyridone-based dyes include ones disclosed in WO 2004/104108 and Japanese Patent Application Laid-Open No. 2003-192930. Specifically, compounds (3) and (4) exemplified below are especially suitable.

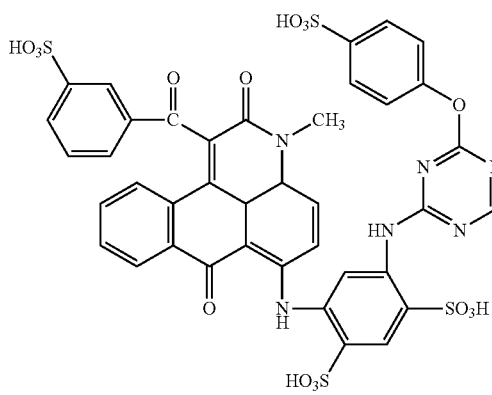

Exemplified Compound (3)

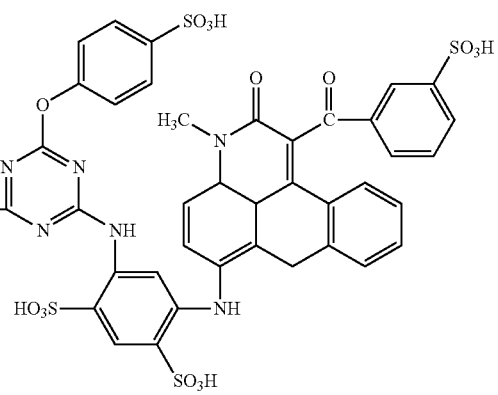

Exemplified Compound (4)

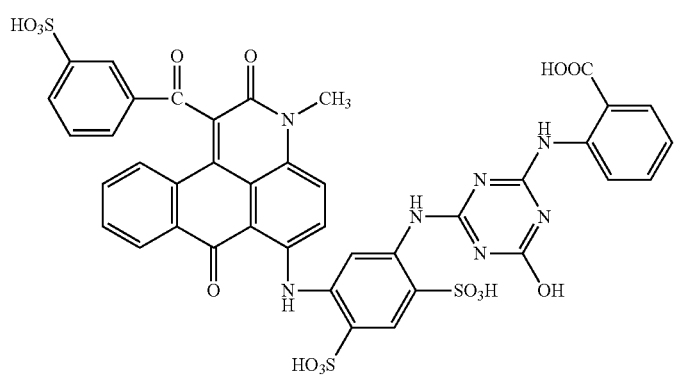

In the present invention, the content B (% by mass) of the second colorant compound (an azo-based dye and/or an anthrapyridone-based dye) in an ink is preferably 0.1% by mass or more and 10.0% by mass or less, and more preferably 0.1% by mass or more and 5.0% by mass or less, based on the total mass of the ink.

As Result of studies, the present inventors have found that the use of a colorant compound represented by the general formula (1) and a second colorant compound in a specific mass ratio can satisfy both the light fastness and the coloring ability of images at especially high levels. In the present invention, in order to achieve the light fastness of images at a higher level, the mass ratio of the content A (% by mass) of a colorant compound represented by the general formula (1) to the content B (% by mass) of a second colorant compound based on the total mass of an ink is preferably 9.0 times or less. Further in order to achieve the light fastness of images at an especially high level, the above mass ratio is more preferably 1.0 time or less. On the other hand, in order to achieve the coloring ability of images at a higher level, the above mass ratio is preferably 0.05 time or more. The total content (% by mass) of coloring materials in an ink is preferably 0.1% by mass or more and 10.0% by mass or less based on the total mass of the ink.

A recording liquid prepared using the colorant compound according to the present invention is suitably used for ink jet recording, particularly for ink jet recording in which recording is performed by ejecting liquid droplets by an action of thermal energy. The colorant compound according to the present invention can additionally be applied not only to applications as a coloring agent but also to applications to electronic materials such as colorants for optical recording and colorants for color filters.

EXAMPLES

Hereinafter, the present invention will be described further in detail by way of Examples and Comparative Examples, but the scope of the present invention is not limited to these Examples.

<Identification of Colorant Compounds>

The identification of an obtained colorant compound was conducted using apparatuses cited below. That is, the apparatuses were a $^1H$ nuclear magnetic resonance spectrometer (ECA-400, made by JEOL Ltd.), an LC/TOF MS (LC/MSD TOF, made by Agilent Technologies Co.) and an UV/Vis spectrophotometer (UV-36000, made by Shimadzu Corp.). Here, the ionization method in LC/TOF MS was the electrospray ionization method (ESI).

<Synthesis of Colorant Compounds>

Synthesis Example 1

A colorant compound (8) represented by the structure shown below was synthesized wherein in the general formula (1), $R_1$, $R_3$, $R_5$, $R_6$, $R_8$ and $R_{10}$ were each a methyl group; $R_2$ and $R_7$ were an acetylamino group; $R_4$ and $R_9$ were a hydrogen atom; and Z was $SO_3M$, and M was sodium.

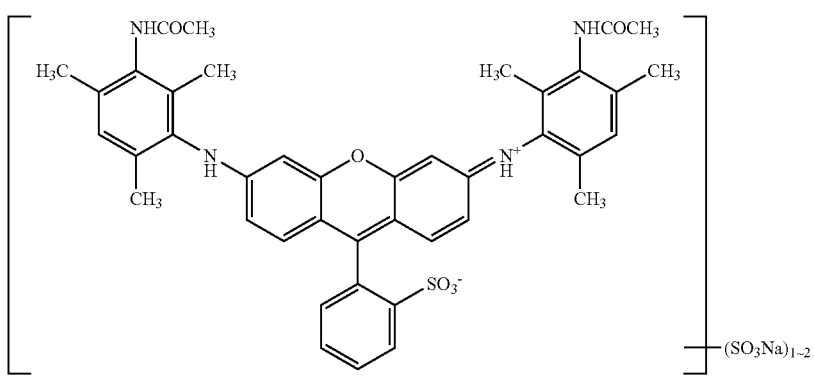

Colorant Compound (8)

3-Acetylamino-2,4,6-trimethylaniline (7.3 g) and the compound (3) (7.4 g) shown in the synthesis scheme described above were allowed to react in sulfolane (20 mL) in the presence of zinc chloride (4.1 g) at 150° C. for 3 hours. The solution was cooled, and poured in 50 mL of 2N-hydrochloric acid; and the precipitated crystal was filtered, washed with water, and thereafter dried to obtain a dried substance. 6 g of the dried substance was added to 30 g of fuming sulfuric acid under ice cooling, and thereafter agitated at 20 to 25° C. for 4 hours. The reaction liquid was discharged on 100 g of ice; and the precipitated sulfonated substance was filtered, and thereafter washed with cool water to obtain a precipitate.

The obtained precipitate was suspended in 50 mL of water, and dissolved by making the pH at 7.0 using a 2N-sodium hydroxide aqueous solution, and thereafter crystallized with acetone to obtain the colorant compound (8). It was confirmed by NMR analysis, LC/TOF MS analysis and UV/Vis spectroscopy using the apparatuses described before that the obtained substance had the structure represented by the formula shown above. The analysis results are shown below.

[Analysis Results of the Colorant Compound (8)]

[1] Result of $^1$H NMR (400 MHz, DMSO-$d_6$, room temperature) (see FIG. 1):

δ[ppm]=11.26 (s, 2H), 9.35 (d, 2H), 7.92 (d, 1H), 7.57 (t, 1H), 7.49 (t, 1H), 7.16 (d, 1H), 7.11 (d, 2H), 7.01 (m, 2H), 6.29 (dd, 2H), 3.38 (s, 18H), 2.09 (s, 6H)

[2] Result of LC/TOF MS analysis (eluate: 0.1%-acetic acid aqueous solution-methanol, ESI):

retention time 5.0 min: purity=23.6 area %, m/z=795.21 (n=1, [M-Na]$^-$)

retention time 6.4 min: purity=75.0 area %, m/z=897.15 (n=2, [M-Na]$^-$), 875.16 (n=2, [M-2Na+H]$^-$)

Figure 5:
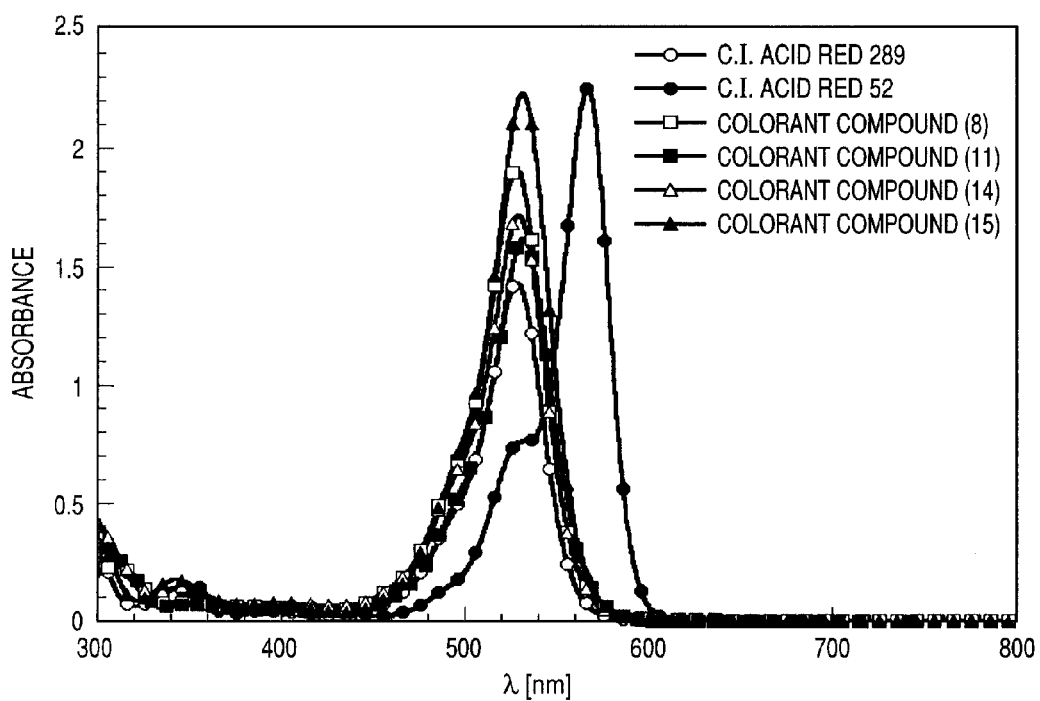
FIG. 5 is an ultraviolet-visible absorption spectra chart of colorant compounds (8), (11), (14) and (15) according to the present invention as well as C.I.Acid Red 289 and 52 in water at 25° C.

[3] Result of UV/Vis spectroscopy (see FIG. 5)

$\lambda_{max}$=527 nm, $\epsilon$=95,594 M$^{-1}$ cm$^{-1}$ (solvent: H$_2$O, 25° C.)

Synthesis Example 2

A colorant compound (11) represented by the structure shown below was synthesized wherein in the general formula (1), $R_1$, $R_3$, $R_5$, $R_6$, $R_8$ and $R_{10}$ were each a methyl group; $R_2$ and $R_7$ were an isobutyrylamino group; $R_4$ and $R_9$ were a hydrogen atom; and Z was SO$_2$M, and M was sodium.

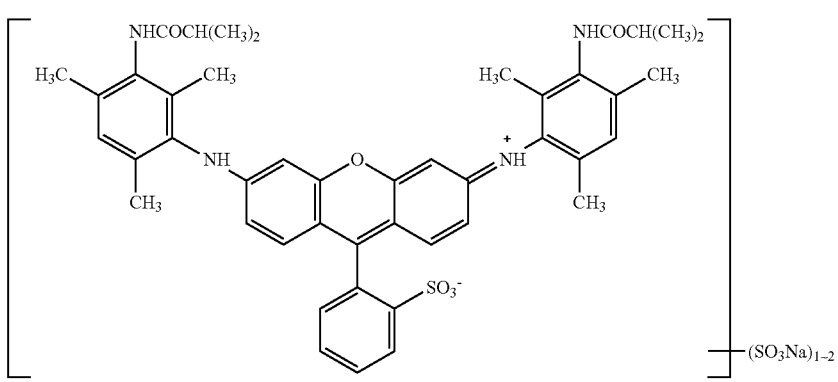

Colorant Compound (11)

3-Isobutyrylamino-2,4,6-trimethylaniline (8.4 g) and the compound (3) (7.4 g) shown in the synthesis scheme described above were allowed to react in sulfolane (20 mL) in the presence of zinc chloride (4.1 g) at 150° C. for 3 hours. The solution was cooled, and poured in 50 mL of a 2N-hydrochloric acid; and a precipitated crystal was filtered, washed with water, and thereafter dried to obtain a dried substance. 6 g of the dried substance was added to 30 g of fuming sulfuric acid under ice cooling, and thereafter agitated at 20 to 25° C. for 4 hours. The reaction liquid was discharged on 100 g of ice; and the precipitated sulfonated substance was filtered, and thereafter washed with cool water to obtain a precipitate.

The obtained precipitate was suspended in 50 mL of water, and dissolved by making the pH at 7.0 using a 2N-sodium hydroxide aqueous solution, and thereafter crystallized with acetone to obtain the colorant compound (11). It was confirmed by NMR analysis, LC/TOF MS analysis and UV/Vis spectroscopy using the apparatuses described before that the obtained substance had the structure represented by the formula shown above. The analysis results are shown below.

[Analysis Results of the Colorant Compound (11)]

Figure 2:
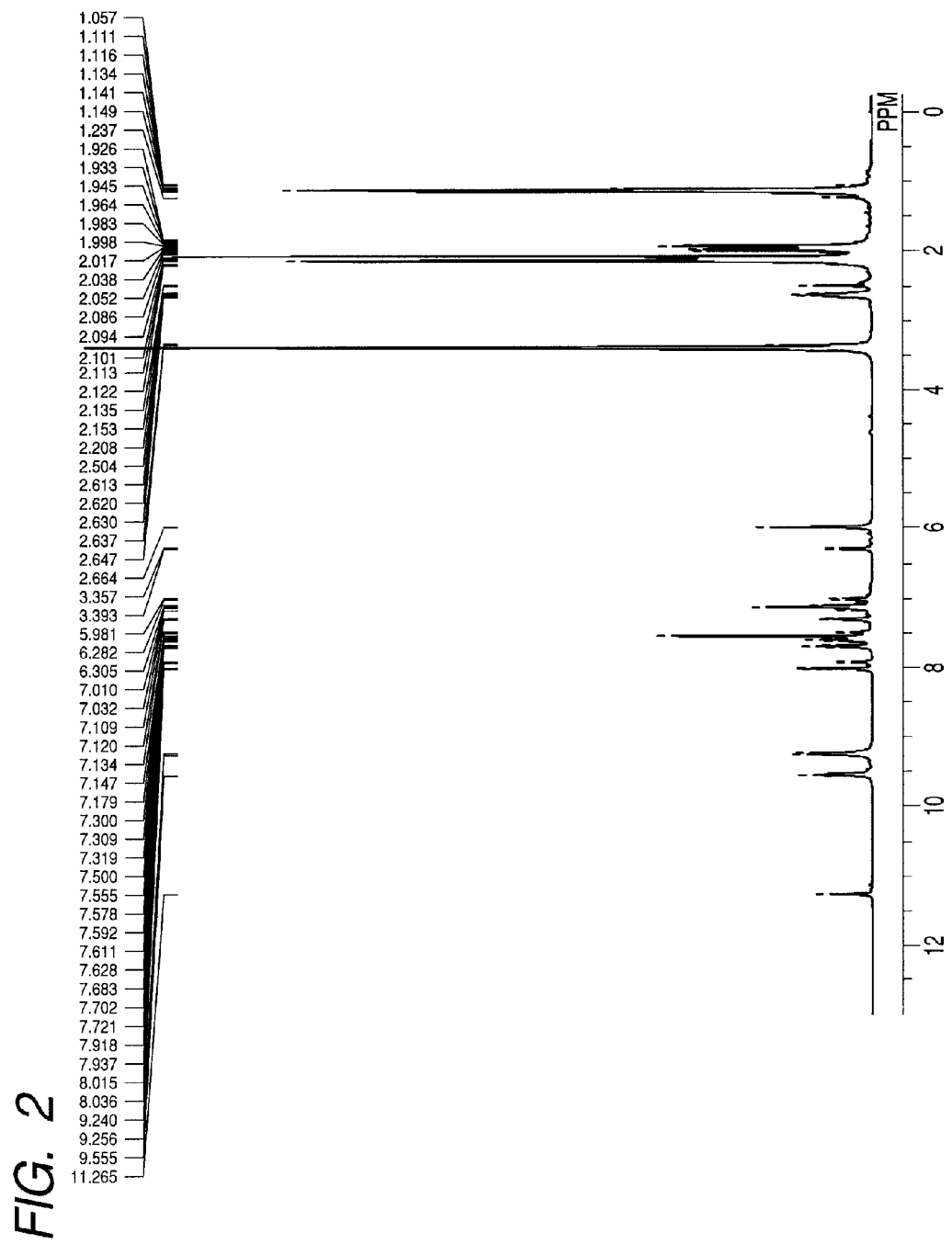
FIG. 2 is a $^1H$ NMR spectrum chart of a colorant compound (11) according to the present invention.

[1] Result of $^1$H NMR (400 MHz, DMSO-$d_6$, room temperature) (see FIG. 2):

δ[ppm]=11.27 (s, 2H), 9.35 (s, 1H), 9.25 (s, 1H), 8.02 (d, 1H), 7.70 (t, 1H), 7.61 (t, 1H), 7.56 (s, 2H), 7.31 (m, 1H), 7.13 (m, 2H), 5.98 (s, 2H), 2.64 (m, 2H), 2.15 (m, 6H), 2.09 (m, 12H), 1.13 (m, 12H)

[2] Result of LC/TOF MS analysis (eluate: 0.1%-acetic acid aqueous solution-methanol, ESI):

retention time 10.2 min: purity=97.0 area %, m/z=931.1 (n=2, [M-2Na+H]$^-$)

[3] Result of UV/Vis spectroscopy (see FIG. 5)

$\lambda_{max}$=530 nm, $\epsilon$=78,967 M$^{-1}$ cm$^{-1}$ (solvent: H$_2$O, 25° C.)

Synthesis Example 3

A colorant compound (14) represented by the structure shown below was synthesized wherein in the general formula (1), $R_1$, $R_3$, $R_5$, $R_6$, $R_8$ and $R_{10}$ were each a methyl group; $R_2$, $R_4$, $R_7$ and $R_9$ were each an acetylamino group; and Z was SO$_3$M, and M was sodium.

[Analysis Results of the Colorant Compound (14)]

Figure 3:
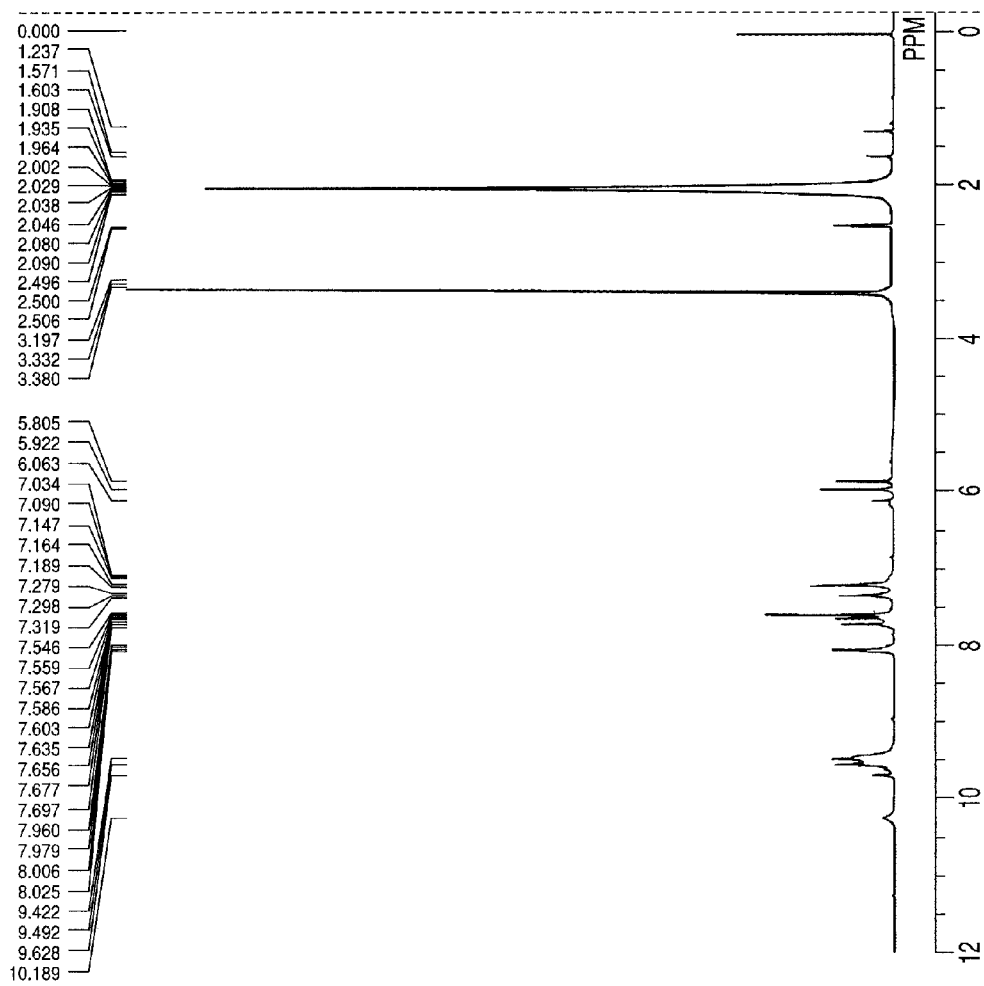
FIG. 3 is a $^1H$ NMR spectrum chart of a colorant compound (14) according to the present invention.

[1] Result of $^1$H NMR (400 MHz, DMSO-$d_6$, room temperature) (see FIG. 3):

δ[ppm]=10.19 (brs, 2H), 9.49 (m, 4H), 8.02 (d, 1H), 7.67 (t, 1H), 7.59 (t, 1H), 7.55 (m, 1H), 7.29 (d, 2H), 7.16 (m, 1H), 5.92 (s, 1H), 5.80 (s, 1H), 3.38 (s, 18H), 2.05 (m, 12H)

[2] Result of LC/TOF MS analysis (eluate: 0.1%-acetic acid aqueous solution-methanol, ESI):

retention time 3.8 min: purity=86.0 area %, m/z=909.26 (n=1, [M-Na]$^-$)

retention time 6.4 min: purity=8.4 area %, m/z=1011.19 (n=2, [M-H]$^-$)

[3] Result of UV/Vis spectroscopy (see FIG. 5)

$\lambda_{max}$=528 nm, $\epsilon$=85,888 M$^{-1}$ cm$^{-1}$ (solvent: H$_2$O, 25° C.)

Synthesis Example 4

A colorant compound (15) represented by the structure shown below was synthesized wherein in the general formula (1), $R_1$, $R_3$, $R_5$, $R_6$, $R_8$ and $R_{10}$ were each a methyl group; $R_2$ and $R_7$ were a benzoylamino group having a carboxyl group (sodium salt); and $R_4$ and $R_9$ were a hydrogen atom.

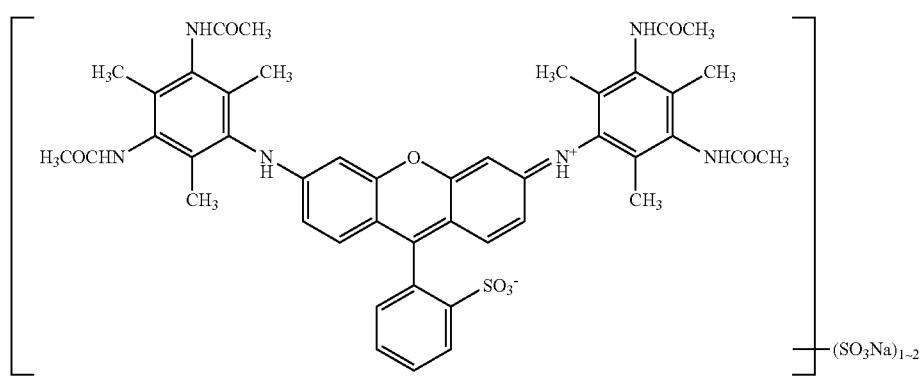

Colorant Compound (14)

3,5-Diacetylamino-2,4,6-trimethylaniline (6.7 g) and the compound (3) (7.4 g) shown in the synthesis scheme described above were allowed to react in sulfolane (20 mL) in the presence of zinc chloride (4.1 g) at 150° C. for 3 hours. The solution was cooled, and poured in 50 mL of 2N-hydrochloric acid; and the precipitated crystal was filtered, washed with water, and thereafter dried to obtain a dried substance.

5 g of the dried substance was added to 30 g of concentrated sulfuric acid under ice cooling, and thereafter agitated at 20 to 25° C. for 4 hours. The reaction liquid was discharged on 100 g of ice; and a precipitated sulfonated substance was filtered, and thereafter washed with cool water to obtain a precipitate.

The obtained precipitate was suspended in 50 mL of water, and dissolved by making the pH at 7.0 using a 6N-sodium hydroxide aqueous solution, and thereafter crystallized with acetone to obtain the colorant compound (14). It was confirmed by NMR analysis, LC/TOF MS analysis and UV/Vis spectroscopy using the apparatuses described before that the obtained substance had the structure represented by the formula shown above. The analysis results are shown below.

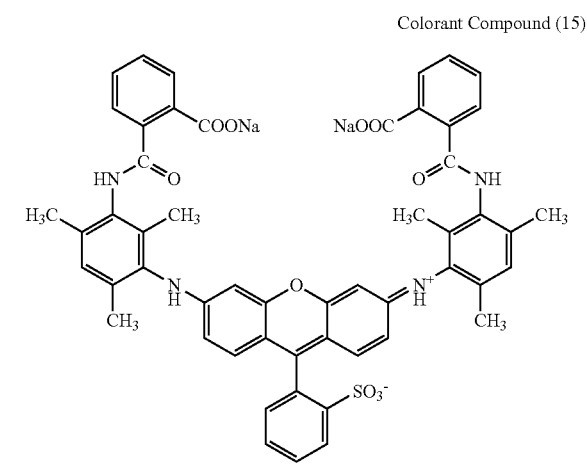

Colorant Compound (15)

15.0 g of the colorant compound (8) obtained above was refluxed in concentrated hydrochloric acid for 30 hours, and cooled, and thereafter discharged in 200 mL of cool water. The pH of the discharged liquid was made at 7.0 at 20 to 30° C. using a 25%-sodium hydroxide aqueous solution, and the liquid was agitated for 30 min; and thereafter, the crystal was filtered, and washed with water. Thereafter, the crystal was dried to obtain a deacetylated substance of the colorant compound (8).

The obtained deacetylated substance (2.5 g) of the colorant compound (8) and phthalic anhydride (1.4 g) were allowed to react in 20 mL of N,N-dimethylformamide at 50 to 60° C. for 6 hours. The reaction liquid was cooled, and thereafter poured in 50 mL of 2N-hydrochloric acid; and the precipitated crystal was filtered. The obtained crystal was washed with water, and dissolved in a 2N-sodium hydroxide aqueous solution, and thereafter crystallized with ethanol to obtain the colorant compound (15). It was confirmed by NMR analysis, LC/TOF MS analysis and UV/Vis spectroscopy using the apparatuses described before that the obtained substance had the structure represented by the formula shown above. The analysis results are shown below.

Figure 4:
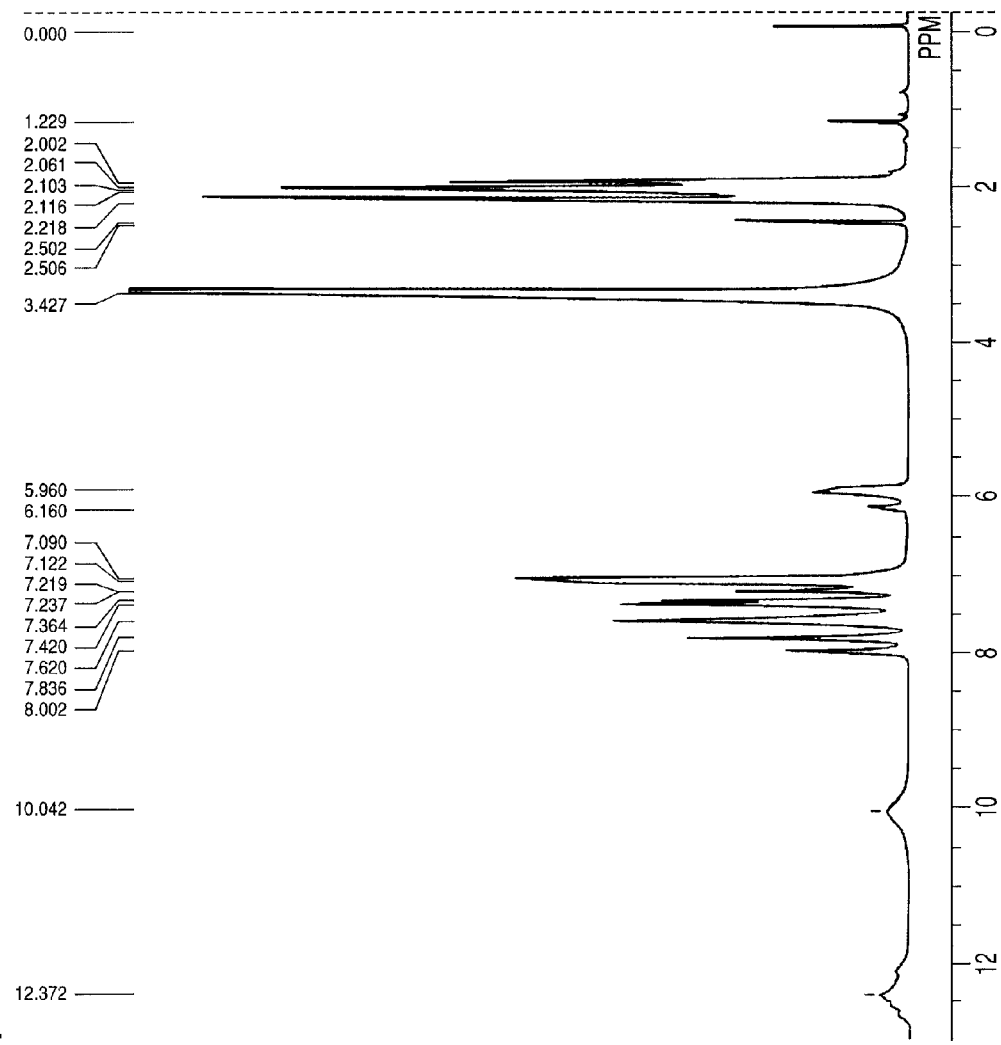
FIG. 4 is a $^1H$ NMR spectrum chart of a colorant compound (15) according to the present invention.

[Analysis Results of the Colorant Compound (15)]
[1] Result of $^1$H NMR (400 MHz, DMSO-$d_6$, room temperature) (see FIG. 4):
δ[ppm]=12.37 (brm, 2H), 10.04 (brs, 2H), 8.00 (dd, 2H), 7.84 (brm, 2H), 7.62 (brm, 4H), 7.39 (brd, 4H), 7.23 (d, 2H), 7.11 (brm, 4H), 5.96 (s, 2 H), 2.22 (brs, 6H), 2.11 (brs, 6H), 2.00 (brs, 6H)
[2] Result of LC/TOF MS analysis (eluate: 0.1%-acetic acid aqueous solution-methanol, ESI):
retention time 19.4 min: purity=99.1 area %, m/z=949.24 ([M-Na]$^-$), 927.26 ([M-2Na—H]$^-$)
[3] Result of UV/Vis spectroscopy (see FIG. 5)
$\lambda_{max}$=530 nm, $\epsilon$=111,574 M$^{-1}$ cm$^{-1}$ (solvent: H$_2$O, 25° C.)

<Synthesis Examples of Other Colorant Compounds>

Colorant compounds (8) to (26) shown in Table 1 shown below were synthesized by the methods according to Synthesis Examples 1 to 4 described above. The structures of these compounds were confirmed as in the colorant compounds (8), (11), (14) and (15) shown above. In Table 1, "Me" denotes a methyl group; "Et" denotes an ethyl group; "n-Pr" denotes a normal-propyl group; and "i-Pr" denotes an isopropyl group. "*" denotes a bonding site of a substituent.

TABLE 1

STRUCTURES OF COLORANT COMPOUNDS (8) TO (26)

| Colorant Compounds | $R_1$ | $R_2$ | $R_3$ | $R_4$ | $R_5$ | $R_6$ |
|---|---|---|---|---|---|---|
| (8) | Me | MeCONH | Me | H | Me | Me |
| (9) | Me | EtCONH | Me | H | Me | Me |
| (10) | Me | n-PrCONH | Me | H | Me | Me |
| (11) | Me | i-PrCONH | Me | H | Me | Me |
| (12) | Me | cyclohexyl-C(=O)NH-* | Me | H | Me | Me |
| (13) | Me | phenyl-C(=O)NH-* | Me | H | Me | Me |
| (14) | Me | MeCONH | Me | MeCONH | Me | Me |
| (15) | Me | 2-(COONa)-phenyl-C(=O)NH-* | Me | H | Me | Me |
| (16) | Me | MeCONH | Me | MeCONH | Me | Me |
| (17) | Me | H | Me | H | Me | Me |
| (18) | Et | MeCONH | H | H | Et | Et |
| (19) | Et | MeCONH | H | H | Et | Me |
| (20) | i-Pr | MeCONH | H | H | i-Pr | Me |
| (21) | Me | MeCONH | Me | MeCONH | Me | Me |
| (22) | Me | MeCONH | EtO | H | Me | Me |
| (23) | Me | MeCONH | phenyl-O-CH2-* | H | Me | Me |

TABLE 1-continued

| | | | | | | |
|---|---|---|---|---|---|---|
| (24) | Me | 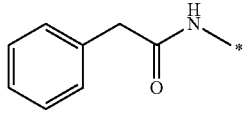 | Me | H | Me | Me |
| (25) | Me | 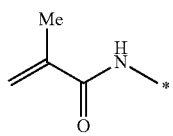 | Me | H | Me | Me |
| (26) | Me | 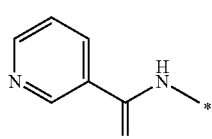 | Me | H | Me | Me |

STRUCTURES OF COLORANT COMPOUNDS (8) TO (26)

| Colorant Compounds | $R_7$ | $R_8$ | $R_9$ | $R_{10}$ | Z | n |
|---|---|---|---|---|---|---|
| (8) | MeCONH | Me | H | Me | $SO_3Na$ | 1-2 |
| (9) | EtCONH | Me | H | Me | $SO_3Na$ | 1-2 |
| (10) | n-PrCONH | Me | H | Me | $SO_3Na$ | 1-2 |
| (11) | i-PrCONH | Me | H | Me | $SO_3Na$ | 1-2 |
| (12) | 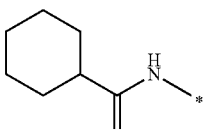 | Me | H | Me | $SO_3Na$ | 1-2 |
| (13) | 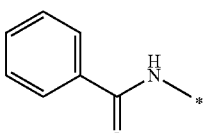 | Me | H | Me | $SO_3Na$ | 1-2 |
| (14) | MeCONH | Me | MeCONH | Me | $SO_3Na$ | 1-2 |
| (15) | 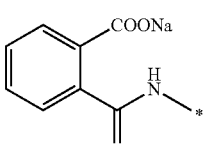 | Me | H | Me | None | 0 |
| (16) | MeCONH | Me | H | Me | $SO_3Na$ | 1-2 |
| (17) | MeCONH | Me | H | Me | $SO_3Na$ | 1-2 |
| (18) | MeCONH | H | H | Et | $SO_3NH_4$ | 1-2 |
| (19) | MeCONH | H | H | Me | $SO_3Na$ | 1-2 |
| (20) | MeCONH | H | H | Me | $SO_3Na$ | 1-2 |
| (21) | MeCONH | H | MeCONH | Me | $SO_2NH_2$ | 2-3 |
| (22) | MeCONH | EtO | H | Me | $SO_3Na$ | 1-2 |
| (23) | MeCONH | 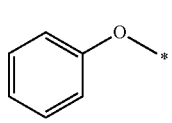 | H | Me | $SO_3Li$ | 1-2 |
| (24) | 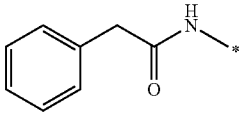 | Me | H | Me | $SO_3Na$ | 1-2 |

TABLE 1-continued

| | | | | | | |
|---|---|---|---|---|---|---|
| (25) | ![Me-C(=CH2)-C(=O)-NH-*] | Me | H | Me | $SO_3Na$ | 1-2 |
| (26) | ![pyridine-3-C(=O)-NH-*] | Me | H | Me | $SO_3Na$ | 1-2 |

Preparation of Recording Liquids

Each component (unit: % by mass) indicated on upper rows in Tables 2 and 3 shown below was mixed, and fully agitated, and thereafter subjected to a pressure filtration with a filter of 0.2 μm in pore size to prepare each recording liquid. Here, the structures of comparative colorant compounds (1) to (4) and combined-use colorant compounds (1) to (4) were as shown below. Although the combined-use colorant compounds are shown as structures of acids, the combined-use colorant compounds (1) and (2) were used as Li salts; and the combined-use colorant compounds (3) and (4) were used as sodium salts. Acetylenol E100 (made by Kawaken Fine Chemicals Co., Ltd.) is a nonionic surfactant obtained by adding ethylene oxide to acetylene glycol.

TABLE 2

| | Examples | | | | | | | | | | |
|---|---|---|---|---|---|---|---|---|---|---|---|
| | 1 | 2 | 3 | 4 | 5 | 6 | 7 | 8 | 9 | 10 | 11 |
| Colorant Compound (8) | 3.50 | | | | | | 3.64 | 3.60 | 2.05 | 2.00 | 0.16 |
| Colorant Compound (11) | | 3.50 | | | | | | | | | |
| Colorant Compound (12) | | | 3.50 | | | | | | | | |
| Colorant Compound (14) | | | | 3.50 | | | | | | | |
| Colorant Compound (15) | | | | | 3.50 | | | | | | |
| Colorant Compound (23) | | | | | | 3.50 | | | | | |
| Comparative Colorant Compound (1) | | | | | | | | | | | |
| Comparative Colorant Compound (2) | | | | | | | | | | | |
| Comparative Colorant Compound (3) | | | | | | | | | | | |
| Comparative Colorant Compound (4) | | | | | | | | | | | |
| Combined Use Colorant Compound (1) | | | | | | | 0.36 | 0.40 | 1.95 | 2.00 | 3.84 |
| Combined Use Colorant Compound (2) | | | | | | | | | | | |
| Combined Use Colorant Compound (3) | | | | | | | | | | | |
| Combined Use Colorant Compound (4) | | | | | | | | | | | |
| Ethylene Glycol | 9.00 | 9.00 | 9.00 | 9.00 | 9.00 | 9.00 | 9.00 | 9.00 | 9.00 | 9.00 | 9.00 |
| Diethylene Glycol | 9.00 | 9.00 | 9.00 | 9.00 | 9.00 | 9.00 | 9.00 | 9.00 | 9.00 | 9.00 | 9.00 |
| Acetylenol E100 | 1.00 | 1.00 | 1.00 | 1.00 | 1.00 | 1.00 | 1.00 | 1.00 | 1.00 | 1.00 | 1.00 |
| Ion Exchange Water | 77.50 | 77.50 | 77.50 | 77.50 | 77.50 | 77.50 | 77.00 | 77.00 | 77.00 | 77.00 | 77.00 |

| | Examples | | | | | | | |
|---|---|---|---|---|---|---|---|---|
| | | 12 | 13 | 14 | 15 | 16 | 17 | 18 | 19 |
| Colorant Compound (8) | | 0.20 | 0.20 | 0.20 | 0.20 | 0.20 | | | |
| Colorant Compound (11) | | | | | | | 0.20 | | |
| Colorant Compound (12) | | | | | | | | | |
| Colorant Compound (14) | | | | | | | | 0.20 | |
| Colorant Compound (15) | | | | | | | | | 0.20 |
| Colorant Compound (23) | | | | | | | | | |
| Comparative Colorant Compound (1) | | | | | | | | | |
| Comparative Colorant Compound (2) | | | | | | | | | |
| Comparative Colorant Compound (3) | | | | | | | | | |
| Comparative Colorant Compound (4) | | | | | | | | | |
| Combined Use Colorant Compound (1) | | 3.80 | | | 1.90 | 1.90 | 1.90 | 1.90 | |

TABLE 2-continued

|  |  |  |  |  |  |  |  |  |
|---|---|---|---|---|---|---|---|---|
| Combined Use Colorant Compound (2) |  | 3.80 |  |  |  |  |  |  |
| Combined Use Colorant Compound (3) |  |  | 3.80 |  | 1.90 | 1.90 | 1.90 | 1.90 |
| Combined Use Colorant Compound (4) |  |  |  | 3.80 |  |  |  |  |
| Ethylene Glycol | 9.00 | 9.00 | 9.00 | 9.00 | 9.00 | 9.00 | 9.00 | 9.00 |
| Diethylene Glycol | 9.00 | 9.00 | 9.00 | 9.00 | 9.00 | 9.00 | 9.00 | 9.00 |
| Acetylenol E100 | 1.00 | 1.00 | 1.00 | 1.00 | 1.00 | 1.00 | 1.00 | 1.00 |
| Ion Exchange Water | 77.00 | 77.00 | 77.00 | 77.00 | 77.00 | 77.00 | 77.00 | 77.00 |

TABLE 3

|  | Comparative Examples | | | | | | | | | | |
|---|---|---|---|---|---|---|---|---|---|---|---|
|  | 1 | 2 | 3 | 4 | 5 | 6 | 7 | 8 | 9 | 10 | 11 |
| Colorant Compound (8) |  |  |  |  |  |  |  |  |  |  |  |
| Colorant Compound (11) |  |  |  |  |  |  |  |  |  |  |  |
| Colorant Compound (12) |  |  |  |  |  |  |  |  |  |  |  |
| Colorant Compound (14) |  |  |  |  |  |  |  |  |  |  |  |
| Colorant Compound (15) |  |  |  |  |  |  |  |  |  |  |  |
| Colorant Compound (23) |  |  |  |  |  |  |  |  |  |  |  |
| Comparative Colorant Compound (1) | 3.50 |  |  |  | 4.00 |  |  |  |  |  | 0.20 |
| Comparative Colorant Compound (2) |  | 3.50 |  |  |  |  |  |  |  |  |  |
| Comparative Colorant Compound (3) |  |  | 3.50 |  |  |  |  |  |  |  |  |
| Comparative Colorant Compound (4) |  |  |  | 3.50 |  |  |  |  |  |  |  |
| Combined Use Colorant Compound (1) |  |  |  |  |  | 4.00 |  |  |  | 2.00 | 1.90 |
| Combined Use Colorant Compound (2) |  |  |  |  |  |  | 4.00 |  |  |  |  |
| Combined Use Colorant Compound (3) |  |  |  |  |  |  |  | 4.00 |  | 2.00 | 1.90 |
| Combined Use Colorant Compound (4) |  |  |  |  |  |  |  |  | 4.00 |  |  |
| Ethylene Glycol | 9.00 | 9.00 | 9.00 | 9.00 | 9.00 | 9.00 | 9.00 | 9.00 | 9.00 | 9.00 | 9.00 |
| Diethylene Glycol | 9.00 | 9.00 | 9.00 | 9.00 | 9.00 | 9.00 | 9.00 | 9.00 | 9.00 | 9.00 | 9.00 |
| Acetylenol E100 | 1.00 | 1.00 | 1.00 | 1.00 | 1.00 | 1.00 | 1.00 | 1.00 | 1.00 | 1.00 | 1.00 |
| Ion Exchange Water | 77.50 | 77.50 | 77.50 | 77.50 | 77.00 | 77.00 | 77.00 | 77.00 | 77.00 | 77.00 | 77.00 |

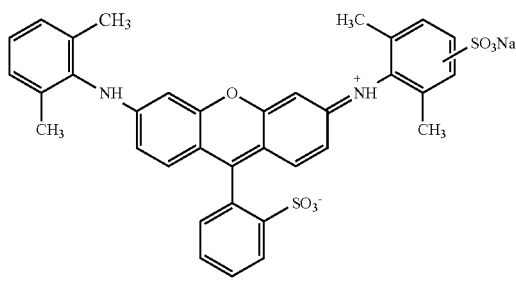

C.I. Acid Red 289
Comparative Colorant Compound (1)

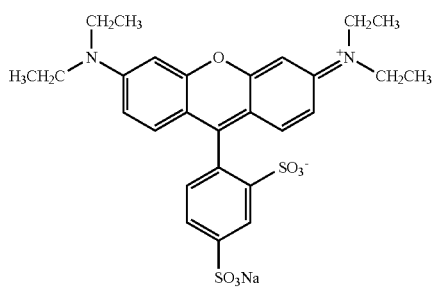

C.I. Acid Red 52
Comparative Colorant Compound (2)

TABLE 3-continued

|  | Comparative Examples | | | | | | | | | | |
|---|---|---|---|---|---|---|---|---|---|---|---|
|  | 1 | 2 | 3 | 4 | 5 | 6 | 7 | 8 | 9 | 10 | 11 |

Comparative Colorant Compound (3)

Comparative Colorant Compound (4)

Combined Use Colorant Compound (1)

Combined Use Colorant Compound (2)

TABLE 3-continued

Comparative Examples

| 1 | 2 | 3 | 4 | 5 | 6 | 7 | 8 | 9 | 10 | 11 |

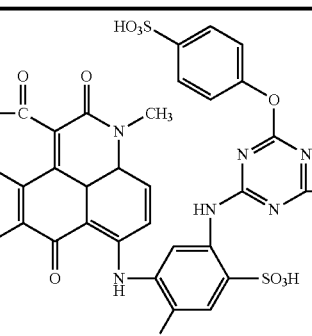

Combined Use Colorant Compound (3)

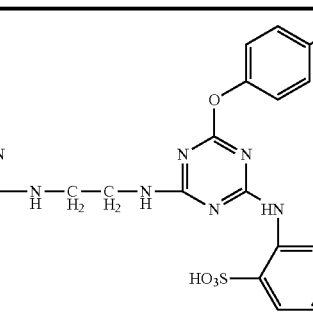

Combined Use Colorant Compound (4)

<Evaluations>
<A Colorant Compound Singly>

First, the cases where as colorant compounds, colorant compounds represented by the general formula (1) were used singly were evaluated.

Recording liquids of Examples 1 to 6 and Comparative Examples 1 to 4 were each put in a cartridge of an ink jet recording apparatus (PIXUS ip8600, made by Canon Corp.) utilizing thermal energy, and installed on the apparatus. As for recording conditions, the temperature was set at a temperature of 23° C.; the relative humidity, at 55%; the recording density, at 600×600 dpi; and the ejection amount, at 2.5 pL. As for recorded products, images were formed on glossy paper (Canon Photo Paper, high-gloss professional PR-201, made by Canon Corp.), with the 100%-duty recording density set at 20 pL, and with the recording duty varied in 10% increments from 0% to 100%. After the image formation, the images were naturally dried at a temperature of 23° C. at a relative humidity of 55% for 24 hours.

Portions of images of 100% in recording duty of the each recorded product obtained by the method described above were measured for L*, a* and b* in the L*a*b* colorimetric system prescribed by CIE (Commission Internationale de l'Eclairage) using a reflection densitometer Spectrolino (made by Gretag Macbeth Co.) under the measurement conditions of a light source of D50 and a visual field of 2°, and were evaluated as follows.

Evaluation of Chroma

The chroma (c*) of the recorded product was calculated based on the measurement of the color characteristics according to the expression described below, and evaluated as follows.

Portions of images of 100% in recording duty in the recorded product (glossy paper) obtained as described above were measured for values of L*, a* and b*. The chroma (c*) was determined based on the expression described below from the obtained values of L*, a* and b*, and evaluated.

$$\text{Chroma}(c^*) = \sqrt{a^{*2} + b^{*2}}$$

A: c* was 80 or more
B: c* was 70 or more and less than 80
C: c* was less than 70

Evaluation of Hue Angle

Further, the hue angle(h°) when a* was 75 to 80 was determined from the result of the chromaticity (L*, a* and b*) according to the expression described below, and evaluated.

$$\text{Hue Angle}(h°) = 360 + \tan^{-1}\frac{b^*}{a^*}$$

A: h° is 340 or more and less than 345
B: h° is 335 or more and less than 340
C: h° is less than 335

It was determined that if an image of the each recorded product obtained as described above had a chroma (c*) of 80 or more and a hue angle (h°) of 340 or more and less than 345, the image having a high magenta coloring ability could be obtained.

Evaluation of Light Fastness

Portions of images of 100% in recording duty in the recorded product obtained as described before were put in a xenon tester (Atlas Weather-Ometer Ci4000, made by Toyo Seiki Seisaku-sho, Ltd.), and exposed to the conditions of a temperature of 24° C. and a humidity of 60%, and an atmosphere of 100 klx for 50 hours. The recorded product before and after the exposure test was measured for the chromaticity (L*, a*, b*) in the L*a*b* colorimetric system prescribed by CIE (Commission Internationale de l'Eclairage) using a reflection densitometer Spectrolino (made by Gretag Macbeth Co.) under the measurement conditions of a light source of D50 and a visual field of 2°. Then, the color change ΔE was calculated from changes of L*, a* and b* (ΔL*, Δa* and Δb*) according to the expression described below, and evaluated.

$$\text{Color Change } (\Delta E) = \sqrt{\Delta L^{*2} + \Delta a^{*2} + \Delta b^{*2}}$$

A: ΔE was less than 5
B: ΔE was 5 or more and less than 10
C: ΔE was 10 or more

Evaluation of Ozone Resistance

Portions of images of 100% in recording duty in the recorded product (printed matter) obtained as described before were exposed to an ozone weathermeter (OMS-H, Suga Test Instruments Co., Ltd.) under the atmosphere of an ozone concentration of 10 ppm, a temperature of 24° C. and a humidity of 60% for 4 hours. Similarly to the above-mentioned light fastness test, the recorded product before and after the exposure test was measured for the chromaticity (L*, a*, b*) in the L*a*b* colorimetric system prescribed by CIE (Commission Internationale de l'Eclairage) using a reflection densitometer Spectrolino (made by Gretag Macbeth Co.) under the measurement conditions of a light source of D50 and a visual field of 2°. Then, the color change ΔE was calculated from changes of L*, a* and b* (ΔL, Δa and Δb), and thereafter was determined according to the standard similar to that in the case of the above-mentioned light fastness.

Results for the above are shown in Table 4.

TABLE 4

|  | Examples | | | | | | Comparative Examples | | | |
|---|---|---|---|---|---|---|---|---|---|---|
|  | 1 | 2 | 3 | 4 | 5 | 6 | 1 | 2 | 3 | 4 |
| Chroma | A | A | A | A | A | A | A | A | B | A |
| Hue Angle | A | A | A | A | A | A | A | C | B | C |
| Light Fastness | A | B | B | A | A | B | C | C | C | C |
| Ozone Resistance | A | A | A | A | A | A | A | C | C | C |

From Table 4, it is clear that recorded products formed from recording liquids of Examples 1 to 6 using the colorant compounds according to the present invention were better than recorded products formed from recording liquids of Comparative Examples 1 to 4 not using the colorant compounds according to the present invention with respect to the color tone, light fastness and ozone resistance.

<Combined Use of Colorant Compounds>

Next, the cases where as colorant compounds, colorant compounds represented by the general formula (1) and other colorant compounds were put in combined use were evaluated.

Recording liquids of Examples 7 to 19 and Comparative Examples 5 to 11 were each put in a cartridge of an ink jet recording apparatus (PIXUS ip8600, made by Canon Corp.) utilizing thermal energy, and installed on the apparatus. As for recording conditions, the temperature was set at 23° C.; the relative humidity, at 55%; the recording density, at 600 dpi×600 dpi; and the ejection amount per droplet of an ink, at 2.5 pL. Then, images were formed on each of two types of recording media described below with the recording duty varied in 10% increments from 0% to 100% (the application amount of the ink in the case of the recording duty of 100% was set at 20 pL). As for the recording media, glossy paper (Canon Photo Paper, high-gloss professional PR-201, made by Canon Corp.), and plain paper (PB PAPER GF-500, made by Canon Corp.) were used. The recorded products obtained were allowed to stand in an environment of a temperature of 23° C. and a relative humidity of 55% for 24 hours to fully dry the images. The images were measured for L*, a* and b* in the L*a*b* colorimetric system prescribed by CIE (Commission Internationale de l'Eclairage) using a reflection densitometer Spectrolino (made by Gretag Macbeth Co.) under the measurement conditions of a light source of D50 and a visual field of 2°, and evaluated as described below.

Evaluation Of Chroma

Portions of images of 100% in recording duty in the recorded product (plain paper) obtained as described above were measured for values of L*, a* and b*. The chroma (c*) was determined based on the expression described below from the obtained values of L*, a* and b*, and evaluated.

$$\text{Chroma}(c^*) = \sqrt{a^{*2} + b^{*2}}$$

AA: c* was 70 or more
A: c* was 68 or more and less than 70
B: c* was 66 or more and less than 68
C: c* was less than 66

Evaluation of Light Fastness (1)

The recorded products (glossy paper) obtained as described above were put in a xenon tester (Atlas Weather-Ometer Ci4000, made by Toyo Seiki Seisaku-sho, Ltd.), and exposed to xenon light under the conditions of a temperature of 24° C. and a humidity of 60%, and under the condition of 100 klx for 50 hours. Then, for portions of the images of 100% in recording duty, the color change (ΔE) was determined from changes of L*, a* and b* (ΔL*, Δa* and Δb*) before and after the exposure test according to the expression described below, and the light fastness (1) was evaluated. The results are shown in Table 4. The evaluation of the light fastness (1) is an evaluation of the light fastness in a short period.

$$\text{Color Change}(\Delta E) = \sqrt{\Delta L^{*2} + \Delta a^{*2} + \Delta b^{*2}}$$

A: ΔE was less than 5
B: ΔE was 5 or more and less than 10
C: ΔE was 10 or more

Evaluation of Light Fastness (2)

The recorded products (glossy paper) obtained as described above were put in a xenon tester (Atlas Weather-O-meter Ci4000, made by Toyo Seiki Seisaku-sho, Ltd.), and exposed to xenon light under the conditions of a temperature of 24° C. and a humidity of 60%, and under the condition of 100 klx for 70 hours. Similarly to the evaluation described above of the light fastness (1), the color change (ΔE) was determined, and the light fastness (2) was evaluated. The evaluation of the light fastness (2) is an evaluation of the light fastness in a long period.

AA: ΔE is less than 7
A: ΔE is 7 or more and less than 10
B: ΔE is 10 or more and less than 15
C: ΔE is 15 or more Evaluation of Ozone Resistance Portions of images of 100% in recording duty in the recorded products obtained as described before were evaluated for the ozone resistance. First, the recorded product was put in an ozone weathermeter (OMS-H, Suga Test Instruments Co., Ltd.), and exposed under the atmosphere of an ozone concentration of 10 ppm, a temperature of 24° C. and a humidity of 60% for 4 hours. Similarly to the above-mentioned light fastness test, the recorded product before and after the exposure test was measured for the chromaticity (L*, a*, b*) in the L*a*b* colorimetric system prescribed by CIE (Commission Internationale de l'Eclairage) using a reflection densitometer Spectrolino (made by Gretag Macbeth Co.) under the measurement conditions of a light source of D50 and a visual field of 2°. Then, the color change ΔE was calculated from changes of L*, a* and b* (ΔL, Δa and Δb), and thereafter was determined according to the standard similar to that in the case of the above-mentioned light fastness (1).

Results for the above are shown in Table 5.

TABLE 5

|  | Examples | | | | | | | | | | | | | Comparative Examples | | | | | | |
| --- | --- | --- | --- | --- | --- | --- | --- | --- | --- | --- | --- | --- | --- | --- | --- | --- | --- | --- | --- | --- |
|  | 7 | 8 | 9 | 10 | 11 | 12 | 13 | 14 | 15 | 16 | 17 | 18 | 19 | 5 | 6 | 7 | 6 | 9 | 10 | 11 |
| Chromaticity | AA | AA | AA | AA | A | AA | AA | AA | AA | AA | AA | AA | AA | AA | C | C | C | C | C | C | AA |
| Light Fastness (1) | A | A | A | A | A | A | A | A | A | A | A | A | A | C | A | C | A | A | A | C |
| Light Fastness (2) | B | A | A | AA | AA | AA | AA | AA | AA | AA | AA | AA | AA | C | AA | C | AA | AA | A | C |
| Ozone-Resistance | A | A | A | A | A | A | A | A | A | A | A | A | A | A | A | A | A | A | A | A |

From Table 5, it is clear that recorded products formed from recording liquids of Examples 7 to 19 using the colorant compounds according to the present invention were better than recorded products formed from recording liquids of Comparative Examples 5 to 11 not using the colorant compounds according to the present invention with respect to the color tone, light fastness and ozone resistance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-217326, filed Sep. 18, 2009, 2009-290110, filed Dec. 22, 2009, which are hereby incorporated by reference herein in their entirety.

What is claimed is:

1. A colorant compound represented by the general formula (1) shown below:

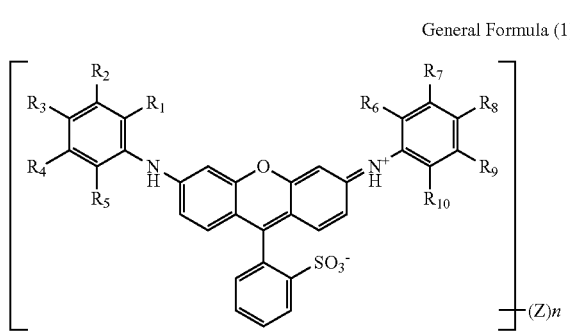

General Formula (1)

wherein $R_1$, $R_5$, $R_6$ and $R_{10}$ each independently denote an alkyl group; $R_3$ and $R_8$ each independently denote one of a hydrogen atom, an alkyl group, an alkoxy group and an aryloxy group; $R_2$, $R_4$, $R_7$ and $R_9$ each independently denote one of a hydrogen atom and an acylamino group represented by the general formula (2) shown below, and at least one of $R_2$, $R_4$, $R_7$ and $R_9$ is an acylamino group represented by the general formula (2) shown below; Z denotes one of an $SO_3H$ group, an $SO_3M$ group and a sulfamoyl group, M denotes one of an ammonium ion and an alkali metal ion, and Z is substituted at a position of at least one hydrogen atom of an aromatic ring; and n denotes an integer of 0 to 3 in the case where at least one of $R_2$, $R_3$, $R_4$, $R_7$, $R_8$ and $R_9$ is substituted with an ionic group, and n denotes an integer of 1 to 3 in the case where none of $R_2$, $R_3$, $R_4$, $R_7$, $R_8$ and $R_9$ is substituted with an ionic group,

General Formula (2)

wherein $R_{11}$ denotes one of an alkyl group, a cycloalkyl group, an aryl group, an arylalkyl group, an alkenyl group and a heterocyclic group; and '*' denotes a bonding site with an aromatic ring in the general formula (1).

2. The colorant compound according to claim 1, wherein $R_{11}$ in the general formula (2) is one of an alkyl group and an aryl group.

3. The colorant compound according to claim 1, wherein $R_{11}$ in the general formula (2) is one of a straight chain alkyl group and an aryl group substituted with an ionic group.

4. The colorant compound according claim 1, wherein the number of the acylamino group represented by the general formula (2) in the general formula (1) is 2 or more and 4 or less.

5. The colorant compound according to claim 1, wherein Z in the general formula (1) is an $SO_3M$ group.

6. The colorant compound according to claim 1, wherein $R_1$, $R_5$, $R_6$ and $R_{10}$ in the general formula (1) are each independently one of a methyl group, an ethyl group and a propyl group.

7. The colorant compound according to claim 1, wherein $R_3$ and $R_8$ in the general formula (1) are each independently one of a methyl group, an ethyl group and a propyl group.

8. The colorant compound according to claim 1, wherein $R_1$ and $R_6$, $R_2$ and $R_7$, $R_3$ and $R_8$, $R_4$ and $R_9$, and $R_5$ and $R_{10}$ in the general formula (1) are each the same substituent.

9. A recording liquid comprising a colorant compound according to claim 1.

10. The recording liquid according to claim 9, comprising a colorant compound having a structure different from the general formula (1) in addition to a colorant compound represented by the general formula (1).

11. The recording liquid according to claim 9, wherein the recording liquid is for ink jet recording.

* * * * *